(12) United States Patent
Vikholm et al.

(10) Patent No.: US 9,975,273 B2
(45) Date of Patent: May 22, 2018

(54) TILE OR MASONRY SAW ASSEMBLY WITH IMPROVED BLADE WETTING CAPABILITY

(71) Applicant: HUSQVARNA AB, Huskvarna (SE)

(72) Inventors: Jens Vikholm, Mellerud (SE); Robert Küsel, Göteborg (SE); Tommy Hellberg, Uppsala (SE); Pontus Karlsson, Göteborg (SE); Magnus Svensson, Jonsered (SE); Karl Elmestrand, Sävedalen (SE); Johan Andersson, Bollebygd (SE)

(73) Assignee: HUSQVARNA AB, Huskvarna (SE)

( * ) Notice: Subject to any disclaimer, the term of this patent is extended or adjusted under 35 U.S.C. 154(b) by 0 days. days.

(21) Appl. No.: 15/460,759

(22) Filed: Mar. 16, 2017

(65) Prior Publication Data

US 2017/0182677 A1   Jun. 29, 2017

Related U.S. Application Data

(63) Continuation of application No. 14/742,924, filed on Jun. 18, 2015, now Pat. No. 9,630,343.

(30) Foreign Application Priority Data

Jun. 18, 2014   (SE) ...................................... 1450761

(51) Int. Cl.
*B28D 1/04* (2006.01)
*B24B 23/02* (2006.01)
*B28D 7/02* (2006.01)
*B23D 59/02* (2006.01)

(52) U.S. Cl.
CPC ............... *B28D 7/02* (2013.01); *B23D 59/02* (2013.01); *B28D 1/042* (2013.01); *B28D 1/044* (2013.01); *B28D 1/045* (2013.01)

(58) Field of Classification Search
CPC .......... B28D 1/04; B28D 1/044; B28D 1/046; B26D 7/08; B24B 23/02
USPC ..... 125/13.01, 13.03, 14; 451/358–359, 350, 451/449–450
See application file for complete search history.

(56) References Cited

U.S. PATENT DOCUMENTS

| | | | | |
|---|---|---|---|---|
| 3,848,929 A * | 11/1974 | Miller | .................... | B23D 59/02 239/568 |
| 4,998,775 A * | 3/1991 | Hollifield | ............... | B28D 1/045 125/14 |
| 6,000,387 A * | 12/1999 | Lee | ....................... | B23D 47/025 125/11.22 |
| 6,439,218 B1 | 8/2002 | Hulett | | |
| 6,450,869 B1 * | 9/2002 | Sherez | ................... | B23D 59/02 451/449 |

(Continued)

*Primary Examiner* — Robert Rose
(74) *Attorney, Agent, or Firm* — McNair Law Firm, P.A.

(57) ABSTRACT

A tile or masonry saw assembly may include a saw and a frame. The saw includes a motor operable to turn a blade of a blade assembly to cut a workpiece. The blade assembly is internally wetted during operation by nozzles disposed on opposing sides of the blade to provide water onto the blade within a blade guard configured to shield a portion of the blade. The frame is operably coupled to the saw to support the workpiece. The frame supports a water collecting system for collecting the water. The water collecting system includes a water tank that is removable from the frame.

20 Claims, 12 Drawing Sheets

(56) References Cited

U.S. PATENT DOCUMENTS

| | | | | |
|---|---|---|---|---|
| 6,916,236 B2* | 7/2005 | Terpstra | ............. | B23Q 11/0046 |
| | | | | 451/358 |
| 6,932,073 B2 | 8/2005 | Zhang | | |
| 7,713,111 B2* | 5/2010 | Layher | ................... | B23D 59/02 |
| | | | | 125/13.01 |
| 7,967,391 B1* | 6/2011 | Dalley | ..................... | B28D 7/02 |
| | | | | 299/39.3 |
| 9,004,982 B2* | 4/2015 | Salomon | ................ | B24B 27/08 |
| | | | | 125/13.03 |

* cited by examiner

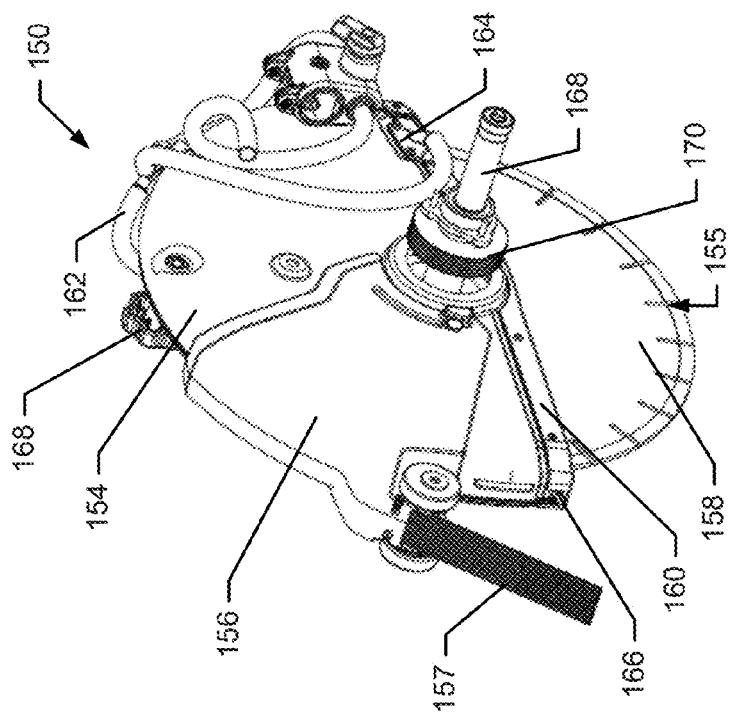
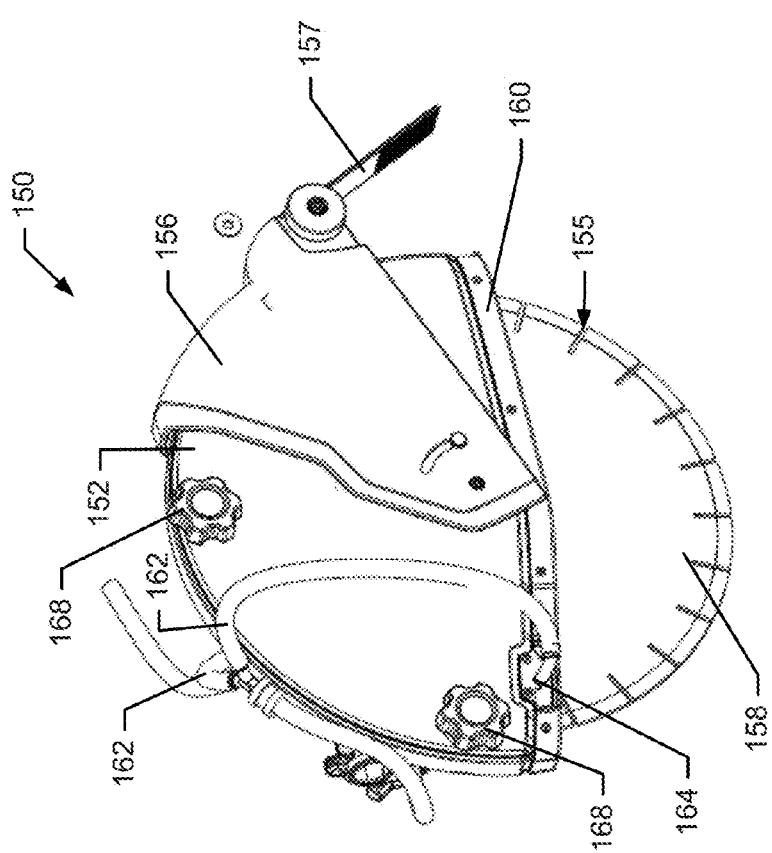

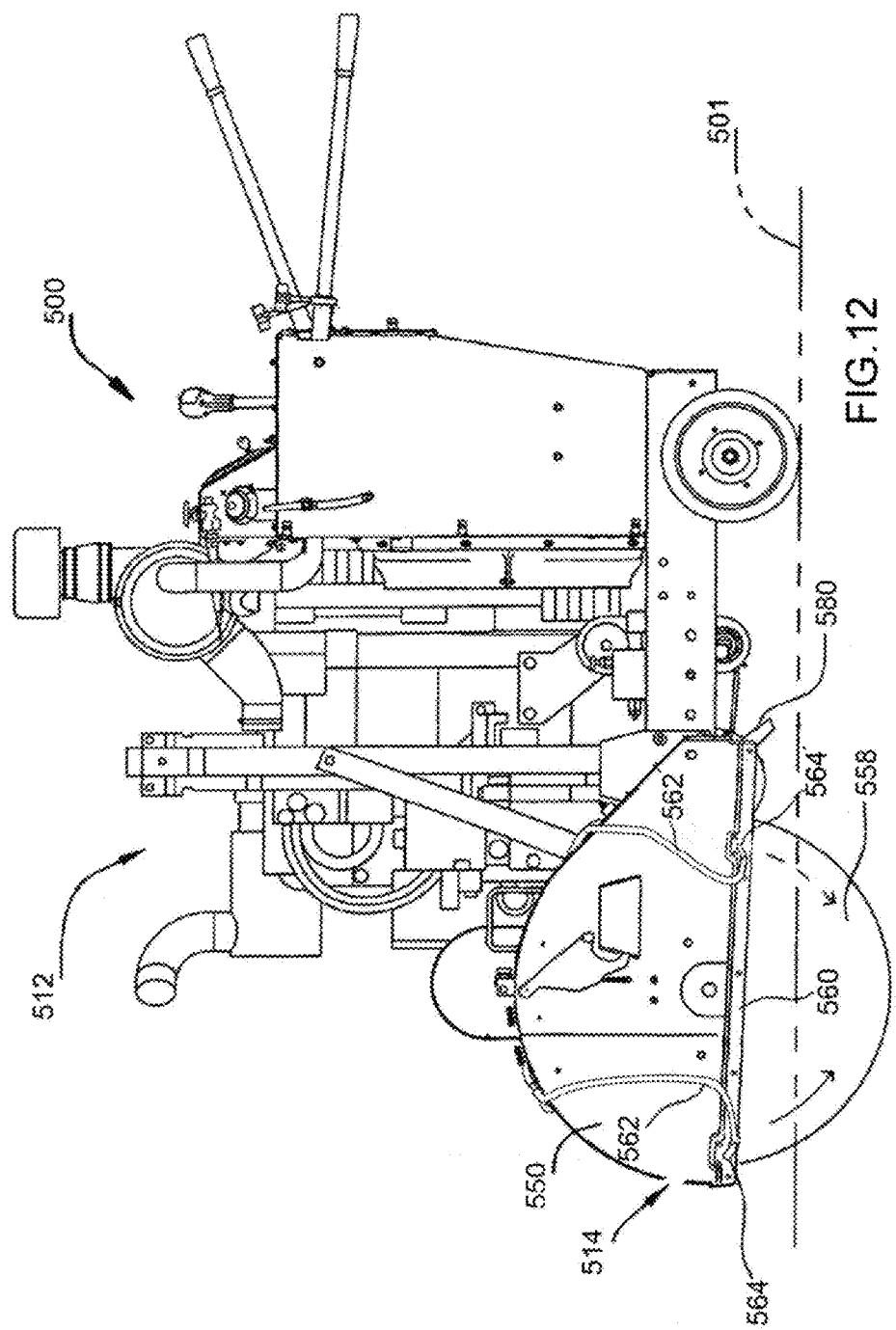

TILE OR MASONRY SAW ASSEMBLY WITH IMPROVED BLADE WETTING CAPABILITY

CROSS-REFERENCE TO RELATED APPLICATIONS

This application is a continuation of U.S. application Ser. No. 14/742,924 filed Jun. 18, 2015, which claims priority to Swedish application number 1450761-0 filed Jun. 18, 2014, all of which are expressly incorporated herein in their entirety.

TECHNICAL FIELD

Example embodiments relate to a tile or masonry saw assembly, and more particularly relate to a tile or masonry saw assembly that is configured to improve the capability of the saw to wet a cutting blade in a relatively clean and easy way. Further it relates to wet a cutting blade of a cut off saw, a floor or wall saw or a floor or road saw.

BACKGROUND OF THE INVENTION

When a user is laying bricks or other masonry workpieces, sometimes the workpieces need to be cut. Cutting may be accomplished with diamond or other cutting blades that may generate a large amount of dust particles that should not be breathed. To control or reduce dust generation, wet cutting may be employed.

Although important, wet cutting may be a fairly messy affair, and the workpieces may be substantially wetted during the process. It is generally necessary to let wet workpieces dry before they can be used. Thus, for conventional blade guards that let water splash all over the workpiece, valuable time can be lost.

BRIEF DISCLOSURE OF THE INVENTION

Therefore there is a need for a saw assembly that can provide sufficient amounts of water for wetting, but also do so in a manner that tends to reduce the excess wetting of the workpieces. As such, some example embodiments may provide a water tank that can be used with the saw assembly to make water transport easy so that ample water for wet cutting can be supplied without risk of spillage. Some example embodiments may also provide for an improved way to collect the water that is sprayed for wet cutting. In this regard, for example, some embodiments may provide for the application of water at an angle to create a mist that hits the material being cut, and flow channels for collecting water and moving it away from the cutting location to keep the workpiece as dry as possible.

In accordance with an example embodiment, a tile or masonry saw assembly may therefore be provided. The tile or masonry saw assembly may include a saw and a frame. The saw may include a motor operable to turn a blade of a blade assembly to cut a workpiece. The blade assembly is internally wetted during operation by nozzles disposed on opposing sides of the blade to provide water onto the blade within a blade guard configured to shield a portion of the blade. The frame is operably coupled to the saw to support the workpiece. The frame supports a water collecting system for collecting the water. The water collecting system includes a water tank that is removable from the frame.

In accordance with another example embodiment, a tile or masonry saw assembly may therefore be provided. The tile or masonry saw assembly may include a saw and a frame. The saw may include a motor operable to turn a blade of a blade assembly to cut a workpiece. The blade assembly is internally wetted during operation by nozzles disposed on opposing sides of the blade to provide water onto the blade within a blade guard configured to shield a portion of the blade. The frame is operably coupled to the saw to support the workpiece. The frame supports a water collecting system for collecting the water. The nozzles are positioned to extend into a portion of the blade guard and to point toward the blade at an upward angle relative to an axis of rotation of the blade.

BRIEF DESCRIPTION OF THE DRAWINGS

In the following description of preferred embodiments, reference will be made to the accompanying drawings, in which.

FIG. 4, which includes FIGS. 4A and 4B, shows opposing perspective views of a blade guard in accordance with an example embodiment;

FIGS. 8A, 8B, 8C, 8D, and 8E, shows various different views of a water tank in accordance with an example embodiment;

FIG. 12 shows a side view of a road saw that may employ a blade guard and nozzles in accordance with an example embodiment.

DESCRIPTION OF PREFERRED EMBODIMENTS

Figure 1:
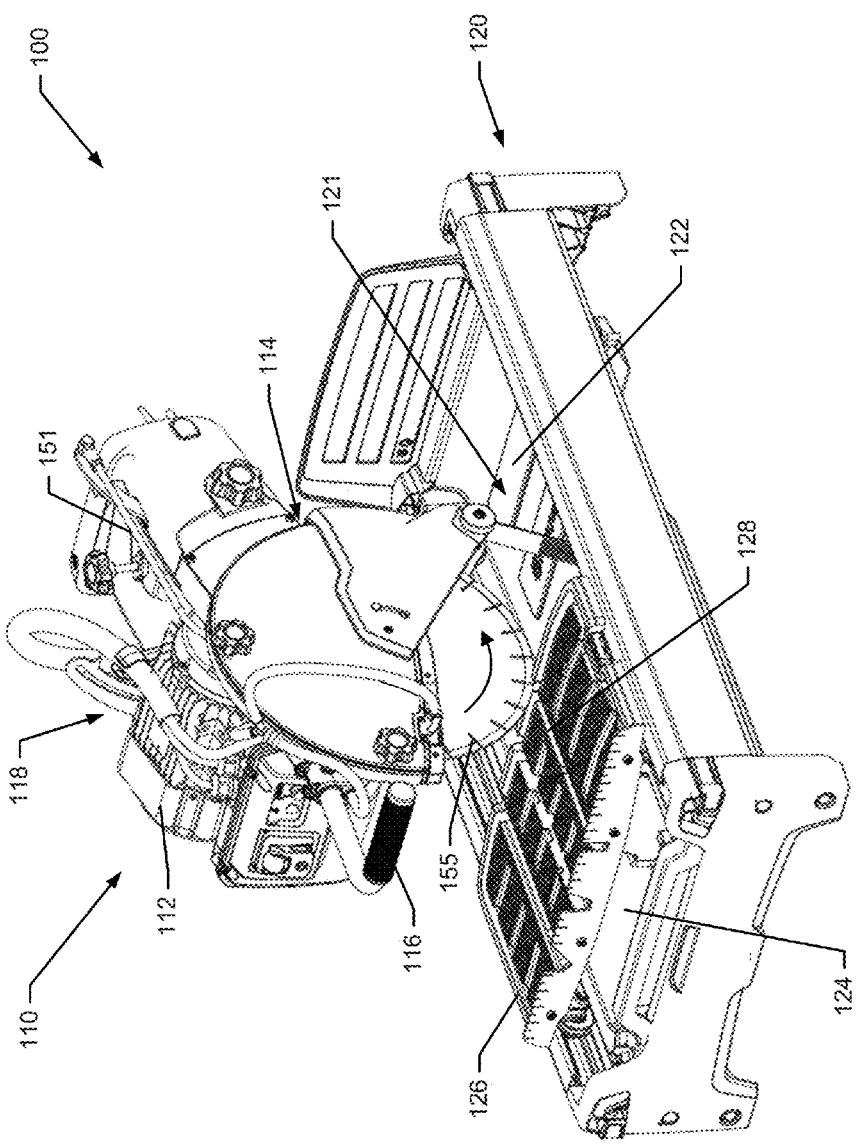
FIG. 1 shows a perspective view of a masonry saw employing a water collecting system and water application techniques in accordance with an example embodiment.

The present invention will be described more fully hereinafter with reference to the accompanying drawings, in which example embodiments of the invention incorporating one or more aspects of the present invention are shown. In the drawings, like numbers refer to like elements.

As mentioned above, some example embodiments may provide operators with the ability to easily provide a saw assembly with water for wet cutting, and may also provide an efficient way to apply and collect the water during such cutting. FIGS. 1-10 show various views of portions of saws that employ example embodiments from different perspectives in order to facilitate description of some example embodiments.

Figure 3:
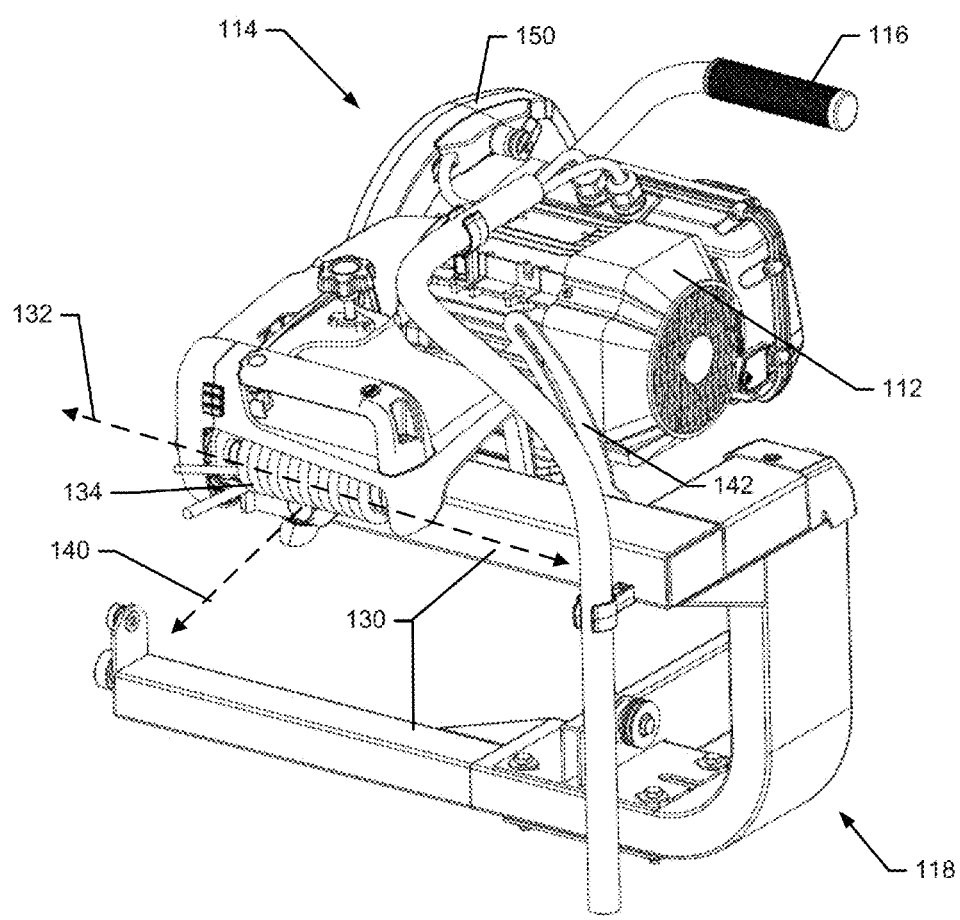
FIG. 3 shows a perspective, rear view of a saw in accordance with an example embodiment.
Figure 5:
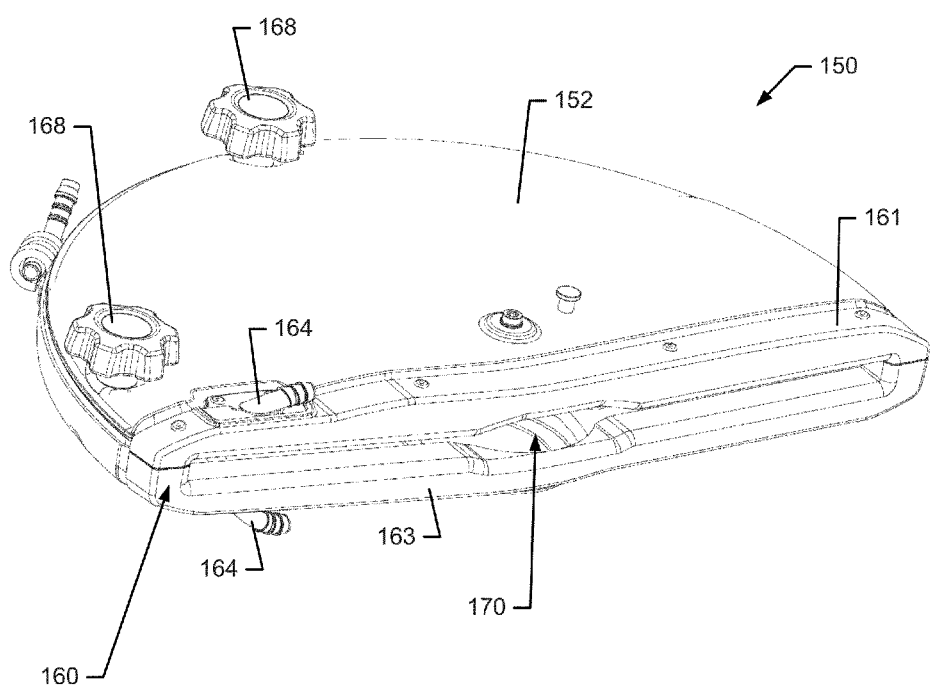
FIG. 5 shows a perspective view of the underside of the blade guard with the blade removed in accordance with an example embodiment.
Figure 6:
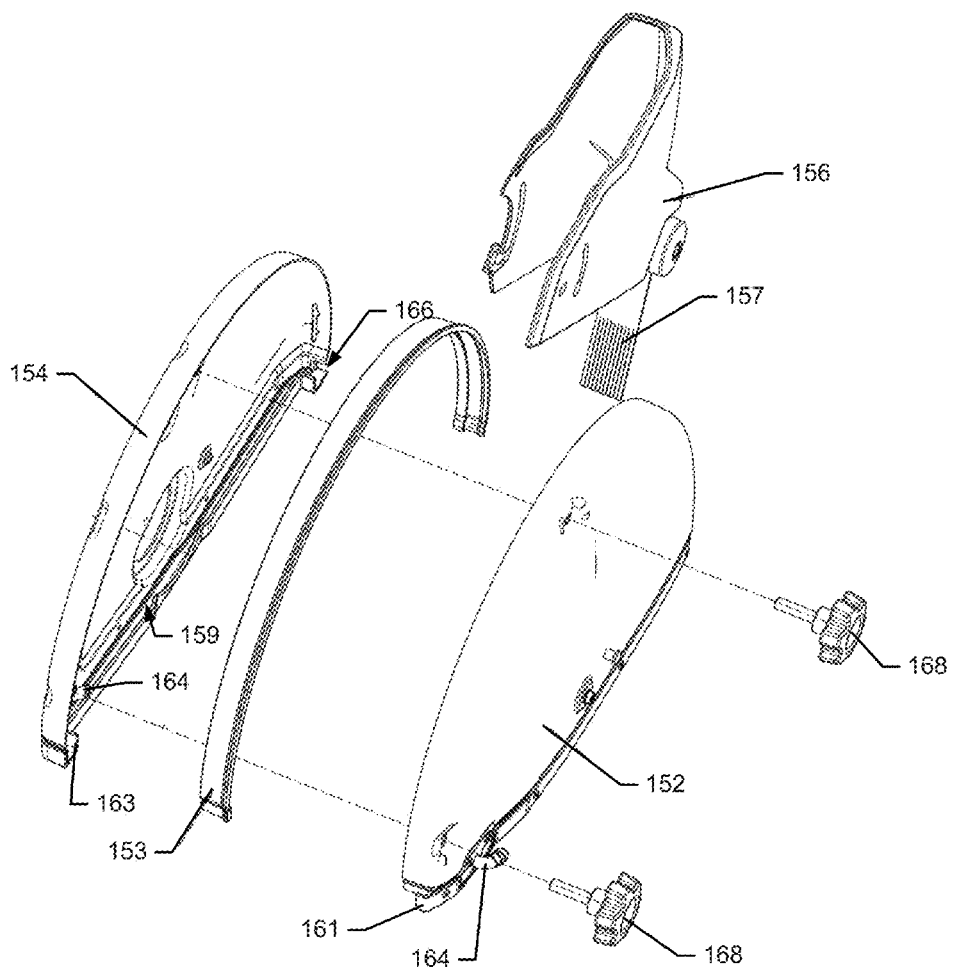
FIG. 6 shows an exploded perspective view of the blade guard in accordance with an example embodiment.
Figure 7:
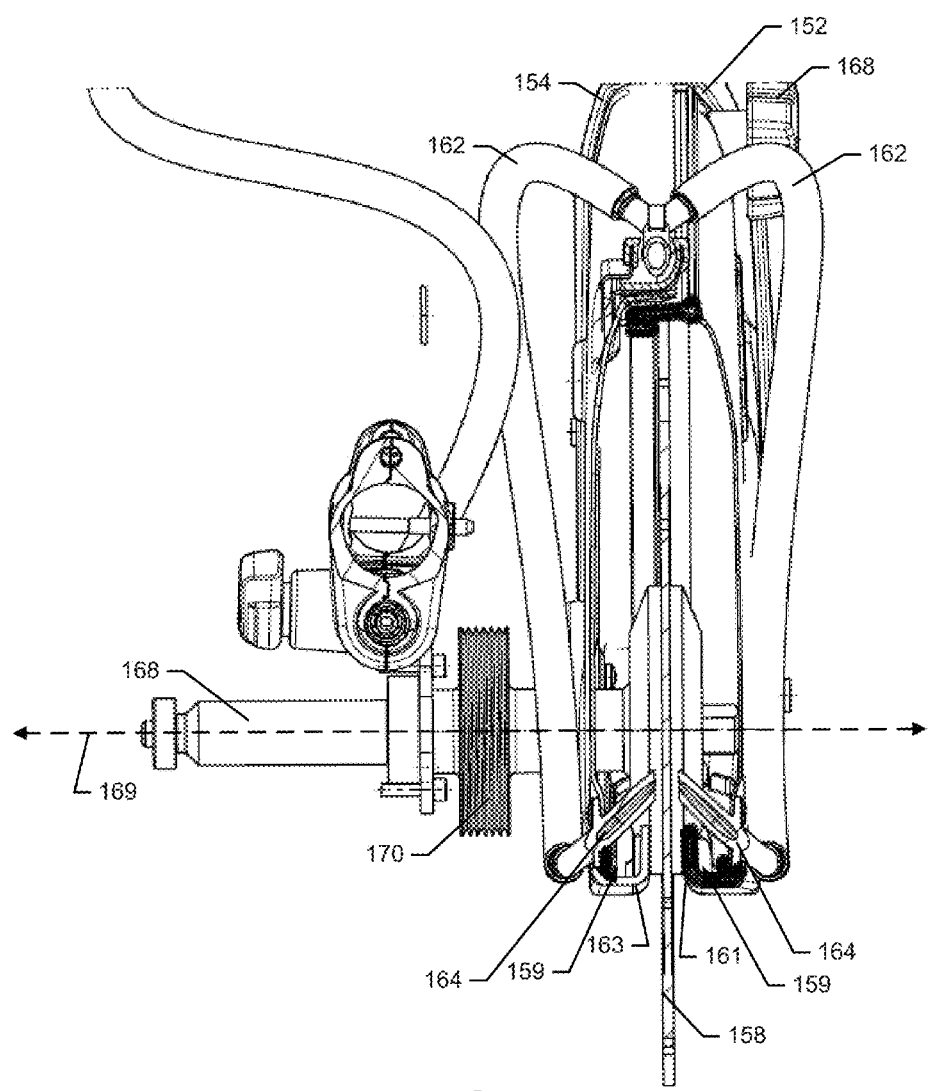
FIG. 7 shows a cross section view of the blade guard in accordance with an example embodiment.
Figure 8:
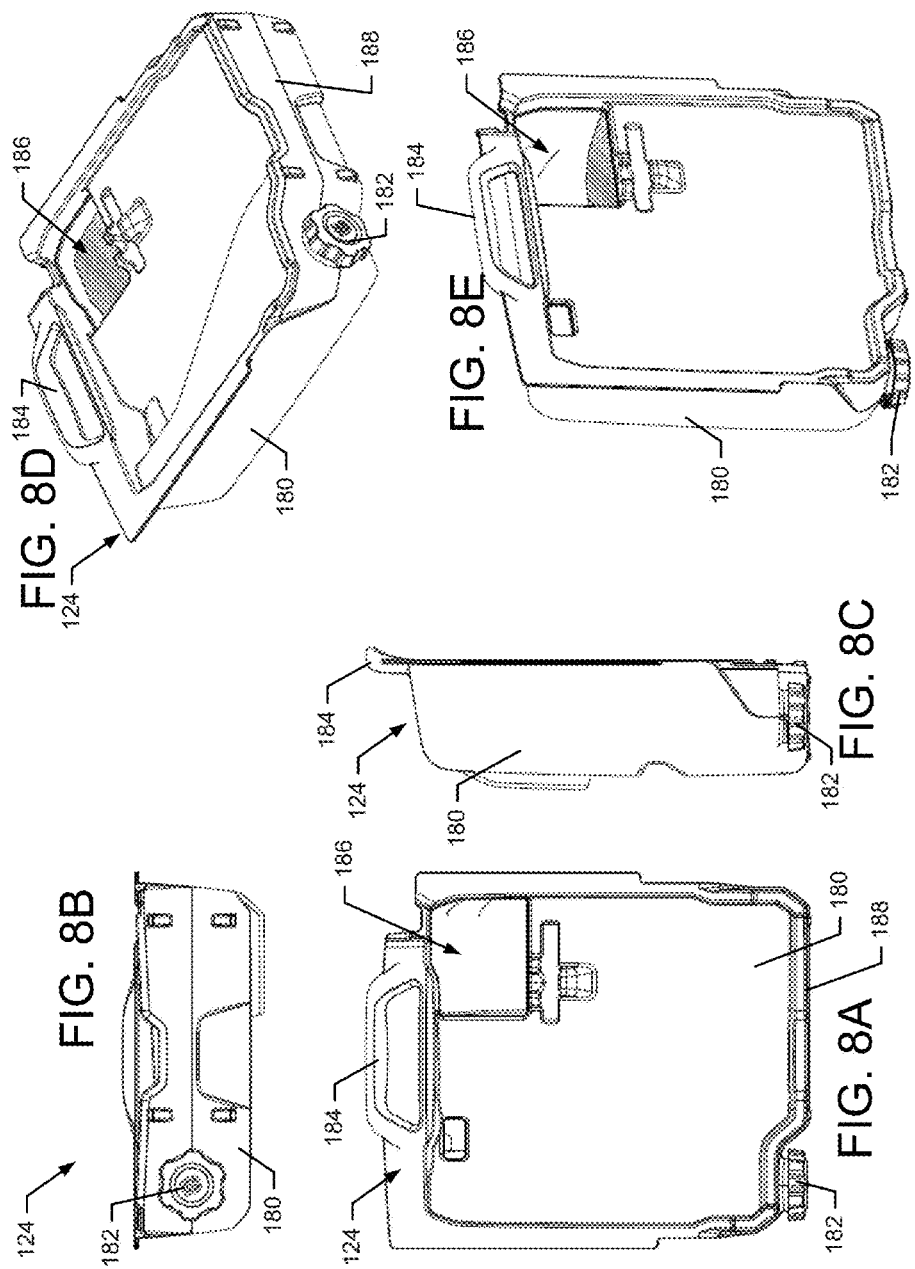
FIG. 8, which includes
Figure 9:
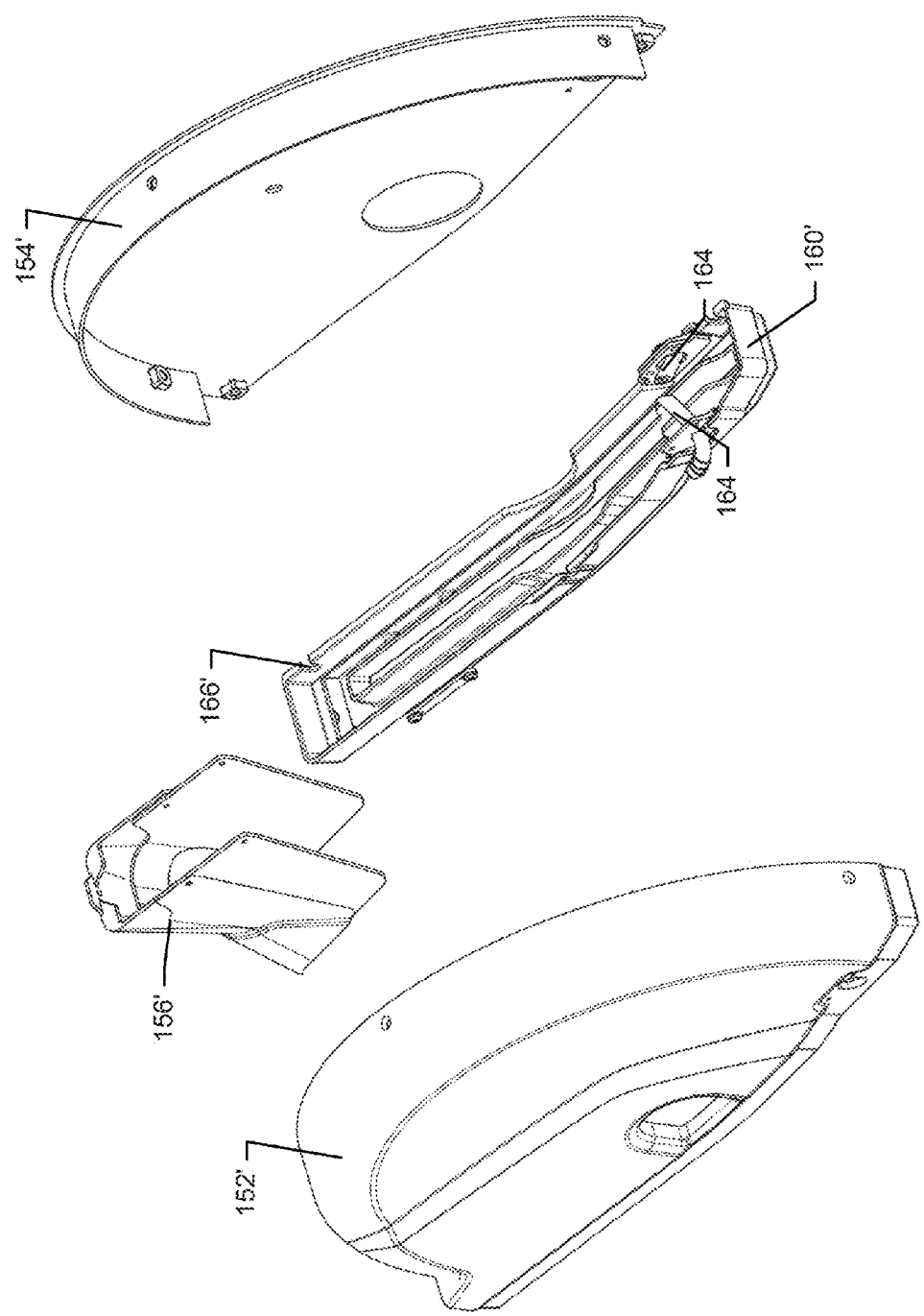
FIG. 9 shows an exploded perspective view of an alternative blade guard in accordance with an example embodiment.
Figure 10:
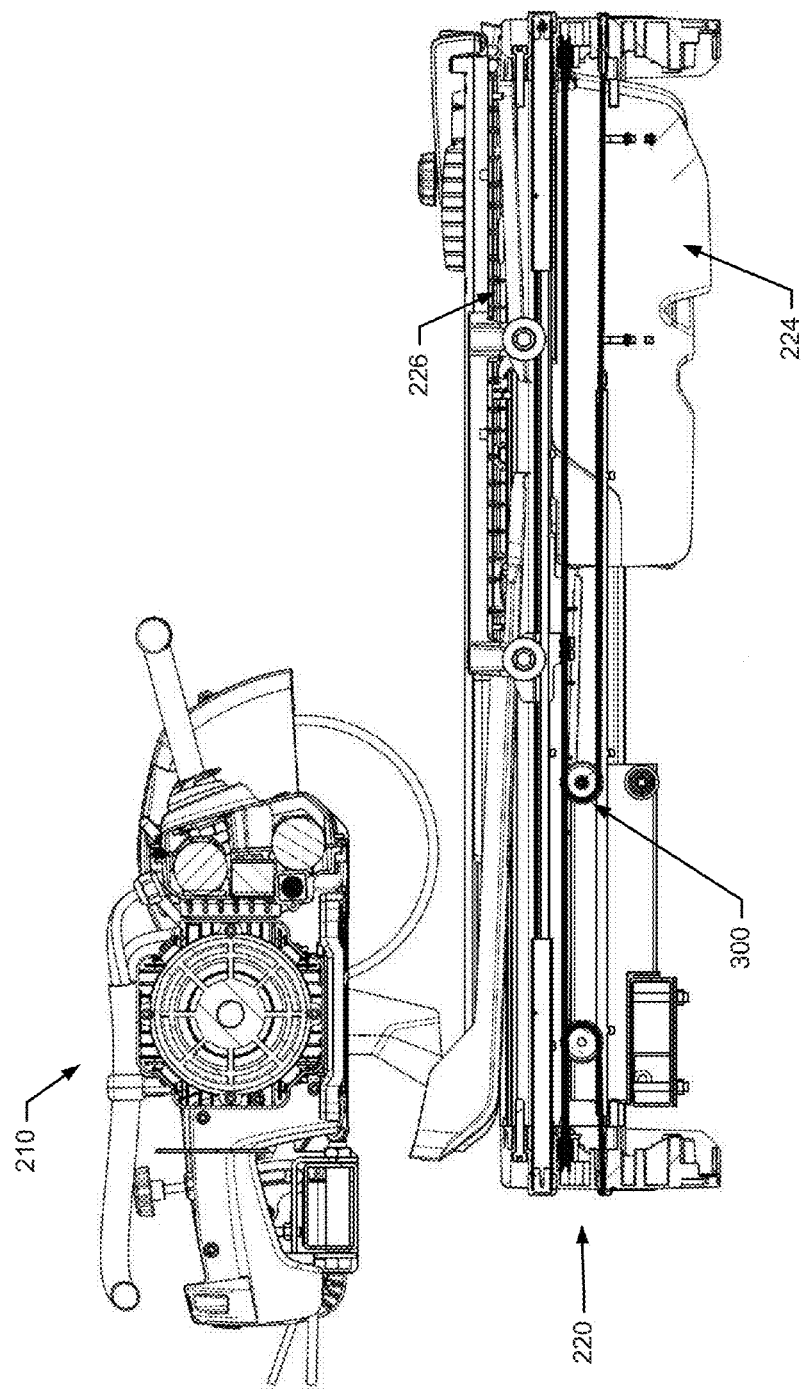
FIG. 10 shows a cross section view of the tile saw and frame in accordance with an example embodiment.

As shown at least in FIGS. 1 and 3, a tile or masonry saw assembly 100 may include a saw 110 and a frame 120. The frame 120 may generally support the saw 110 so that the saw can be moved relative to the frame 120 to execute cutting operations with the saw 110. The saw 110 may include a motor 112 that is operable responsive to selective application of power from a power source. Based on the power source employed, the motor 112 may be, for example, either electric powered or gasoline/petrol powered. Accordingly, responsive to application of power to the motor 112, the motor 112 may be configured to power a blade assembly 114 to cut a workpiece that may be, for example, tile, stone, brick, concrete or other such construction materials. The operator may at least partially control operation of the saw 110 via a handle 116 that allows a movement assembly 118 of the saw 110 to be employed to move the saw 110 relative to the frame 120. As mentioned above, the saw 110 may employ wet cutting such that water is applied to the blade assembly 114 via mechanisms described in greater detail below.

The frame 120 may include a water collection system 121 that operates to collect at least some of the water that is applied to the blade assembly 114. The water collection system 121 may include a collector 122 disposed at one end of the frame 120. The collector 122 may extend between lateral sides of the frame 120 from one longitudinal end of the frame 120 toward a water tank 124 that is disposed at the opposite longitudinal end of the frame 120. Thus, the collector 122 and the water tank 124 may combine to form a surface for collecting any water expelled from the blade assembly 114 during operation.

The collector 122 may generally lie horizontally within the frame 120 and may include sloped sides that direct water from areas near the lateral edges of the collector 122 toward a longitudinal centerline of the frame 120. The collector 122 may also be sloped to direct water away from the longitudinal end of the frame 120 to which the collector 122 is proximate toward the water tank 124.

The water tank 124 may collect the water provided thereto by the collector 122 for reuse in application of water to the blade assembly 114. Thus, the water collection system 121 of an example embodiment may provide a relatively efficient way to apply, collect and reuse water for wet cutting.

The frame 120 may also include a workpiece support 126, which may provide a framework for supporting workpieces that are to be cut using the saw 110. The workpiece support 126 may be a substantially planar support structure that extends transversely across the frame 120 to hold workpieces being cut. The workpiece support 126 may be enabled to slide or roll along the longitudinal length of the frame 120 such that it is supported above either or both of the collector 122 and the water tank 124. The workpiece support 126 may include trenches 128 or cutout portions that define recesses in which the cutting element of the blade assembly 114 may rotate when a cutting operation is conducted. The trenches 128 may also operate to direct any water that is sprayed therein or otherwise collects therein to either or both of the collector 122 and the water tank 124.

As shown in FIG. 3, the movement assembly 118 may include support arms 130 that are bent to form a U or C shape such that one arm of the U or C shape supports the saw 110 and the other arm of the U or C shape movably couples the saw 110 to the frame 120. The saw 110 may be pivotally mounted to one of the support arms 130 so that the saw 110 can pivot about a pivot axis 132 that is substantially perpendicular to the longitudinal length of the frame 120. In some cases, torsion springs 134 may be provided to facilitate rotation about the pivot axis 132 so that the operator can pivot the saw 110 with less manual force applied. In an example embodiment, rotation about a tilt axis 140 may also be possible so that the saw 110 may be tilted to achieve angled cuts. As such, the saw 110 may include a locking plate 142, which may include an arcuate slot inside which a clamping member may ride and be tightened to lock the saw 110 at a desirable tilt angle following rotation about the tilt axis 140. The tilt axis 140 may extend parallel to the longitudinal axis of the frame 120.

In an example embodiment, the blade assembly 114 may include a blade guard 150 that may be formed, in some cases, of two separate members that may form half-shells (e.g., first blade guard member 152 and second blade guard member 154). The blade guard 150 may include a rotating splash guard 156 that may be pivotally coupled to the blade guard 150 to direct water toward the water collecting system 121. In this regard, for example, a blade 158 of the saw 110 may be at least partially housed within the blade guard 150. However, the blade guard 150 may leave less than half of the blade 158 exposed and therefore shield only the remaining, unexposed portion. The rotating splash guard 156 may be rotatable over a predefined range that may extend over the unexposed portion, but may also enable at least a portion of the exposed portion of the blade 158 to also be covered or surrounded on lateral sides by the rotating splash guard 152. Water splashing (e.g., responsive to spraying of water onto the blade 158) caused by water being carried in cutouts 155 on the blade 158 may be deflected to the collector 122 by the rotating splash guard 152 or by a tail piece 157 of the rotating splash guard 152.

The rotating splash guard 156 may be pivotally coupled to the first blade guard member 152 and the second blade guard member 154 via one or more arcuate slots provided in the rotating splash guard 156 to receive a corresponding one or more protrusions that extend from opposing sides of the first blade guard member 152 and the second blade guard member 154. In some cases, the protrusions and/or slots may be configured such that the rotating splash guard 156 can be rotated to a point at which the slots and protrusions are aligned in such a was as to allow the rotating splash guard to be removed without the use of tools.

Water may be provided into the blade guard 150 and collected at a water collector 160 that may be defined by channels 159 that extend along lateral sides of the blade 158. The provision of water into the blade guard 150 may be accomplished via one or more control valves, pumps and/or hoses 162 that may supply water to nozzles 164. The nozzles 164 may be provided at an opposite end of the blade guard 150 relative to the end over which the rotating splash guard 156 extends. In some embodiments, the hoses 162 may be mounted or otherwise provided proximate to an outside of the blade guard 150 to route water to the nozzles 164. Meanwhile, the nozzles 164 may be positioned to extend from outside of the first blade guard member 152 and the second blade guard member 154, through the first blade guard member 152 and the second blade guard member 154 into a portion of the blade guard 150. Moreover, the nozzles 164 may be pointed toward the blade 158 (e.g., at an upward angle relative to an axis of rotation 169 of the blade 158). Water may therefore be provided through the hoses 162 to the nozzles 164 to a location very close to the blade 158 to direct the water onto the blade 158. The rotation of the blade 158 about an axle 168 that is turned by a belt pulley 170 operably coupled to the motor 112 and, in some cases, the collection of water in the cutouts 155, may cause a mist to be created to minimize dust distribution when the workpiece is cut.

In an example embodiment, the nozzles 164 may be positioned to be proximate to the blade 158 within a distance less than 5 mm, and possibly less than 4 mm from the blade 158. The nozzles 164 may also be directed at an angle (e.g., relative to the axis of rotation 169 of the blade 158) that is greater than 15 degrees, or even greater than 30 degrees relative to the axis of rotation 169. In some embodiments, the nozzles 164 may be directed at an angle of about 45 degrees relative to the axis of rotation 169. The nozzles 164 are also provided proximate to an end of the water collector 160 that is closest to the operator.

The water that is misted within the blade guard 150 proximate to the blade 158 may be collected in the channels 159 of the water collector 160. A relatively small tolerance may be provided between inner sidewalls of the water collector 160 and the blade 158 to attempt to keep splashing to a minimum. However, it is important that at least some water be carried to the cutting site to minimize dust generation, so some of that water may be carried out of the blade guard 150 may be deflected by the rotating splash guard 156 and/or the tail piece 157 and directed down into the collector 122 and water tank 124. Meanwhile, water collected in the channels 159 of the water collector 160 may be transported toward an outlet 166 that is disposed at an opposite end of the water collector 160 from the end near which the nozzles 164 are provided. The outlet 166 may also be at a lower elevation than the elevation at which the end of the water collector 160 to which the nozzles 164 are proximate. Alternatively or additionally, a link 151 may be provided on the saw 110 to slightly rotate, pivot or turn the blade guard 150 during execution of a cut, so that the channels 159 are sloped downward toward the outlet 166 while progressing through the cut. Thus, all water in the water collector 160 may gravity drain out the outlet 166 and into the water collector 122 or water tank 124.

In an example embodiment, the water collector 160 may define a blade aperture 170 through which the blade 158 extends. As can be appreciated from FIG. 6, the first and second blade guard members 152 and 154 may have a gasket 153 that may be provided at the joint therebetween to maintain the joint waterproof. Thus, the only place for water injected into the blade guard 150 to go is generally onto the blade 158 (or in the cutouts 155), or into the channels 159 with minimal splashing of water.

The two portions of the blade guard 150 (i.e., the first and second blade guard members 152 and 154) may be removable from each other so that, for example, the blade 158 can be easily replaced. Connection knobs 168 or any other fastener may be employed to facilitate securing the first and second blade guard members 152 and 154 together or taking them apart. Given that the first and second blade guard members 152 and 154 may be taken apart, it may also be appreciated that some embodiments may enable the water collector 160 to also be split into two corresponding parts. Thus, for example, separate channel members (e.g., a first channel member 161 and a second channel member 163) may be provided at a bottom of each respective one of the first and second blade guard members 152 and 154. However, in an alternative embodiment, shown in FIG. 9, the first and second blade guard members 152' and 154' may be separable and may support a rotating splash guard 156' as described above. However, the water collector 160' may be defined as a single, unitary piece removable from the blade guard 150. In such an example, the nozzles 164 may still be positioned closest to the operator and the outlet 166' may be defined at an opposite end (and at a lower elevation) than the nozzles 164.

In an example embodiment, the water tank 124 may form a container that can not only collect water for potential reuse, but also allow the water to be transported. In this regard, the water tank 124 may be defined by container walls 180 on six sides. A cap 182 may be provided on one of the walls 180 that may be a bottom wall 188 when the water tank 124 is oriented vertically, but may be a side wall when the water tank 124 is oriented horizontally (as would be the case when the water tank 124 is installed in the frame 120). Thus, the cap 182 may be removed so that water can be filled into the water tank 124. However, the cap 182 may be provided at a recessed portion of the bottom wall 188 so that, in the vertical orientation, the water tank 124 stands on the bottom wall 188 and the cap 182. Thus, the bottom wall 188 may represent a raised portion relative to a portion of the water tank 124 at which the cap 182 is provided. The water tank may also include a handle 184 that is disposed on an opposite side of the water tank 124 relative to the cap 182 so that the water tank 124 may be easily removable from the frame 120 and be easily transportable by hand. In some embodiments, the handle 184 may be an integral part of the water tank 124.

In some embodiments, due to the fact that the water is desired for reuse, a pump housing portion 186 (or pump cavity) may be provided to house a pump to pump water to the nozzles 164. The pump housing portion 186 may have an entrance thereto constructed to filter or otherwise settle out sediments so that the sediments are not likely to enter the pump housing portion 186. In some embodiments, at least one surface of the water tank 124 (e.g., the sidewall 180 that faces upward when the water tank 124 is in the horizontal orientation) may be configured to receive water from the collector 122, outlet 166, or from settling of splashing or misting water and conduct the water to an entrance into the water tank 124. Accordingly, the water tank 124 may be a portion of a water cycle for wet cutting using the saw assembly 100.

Figure 2:
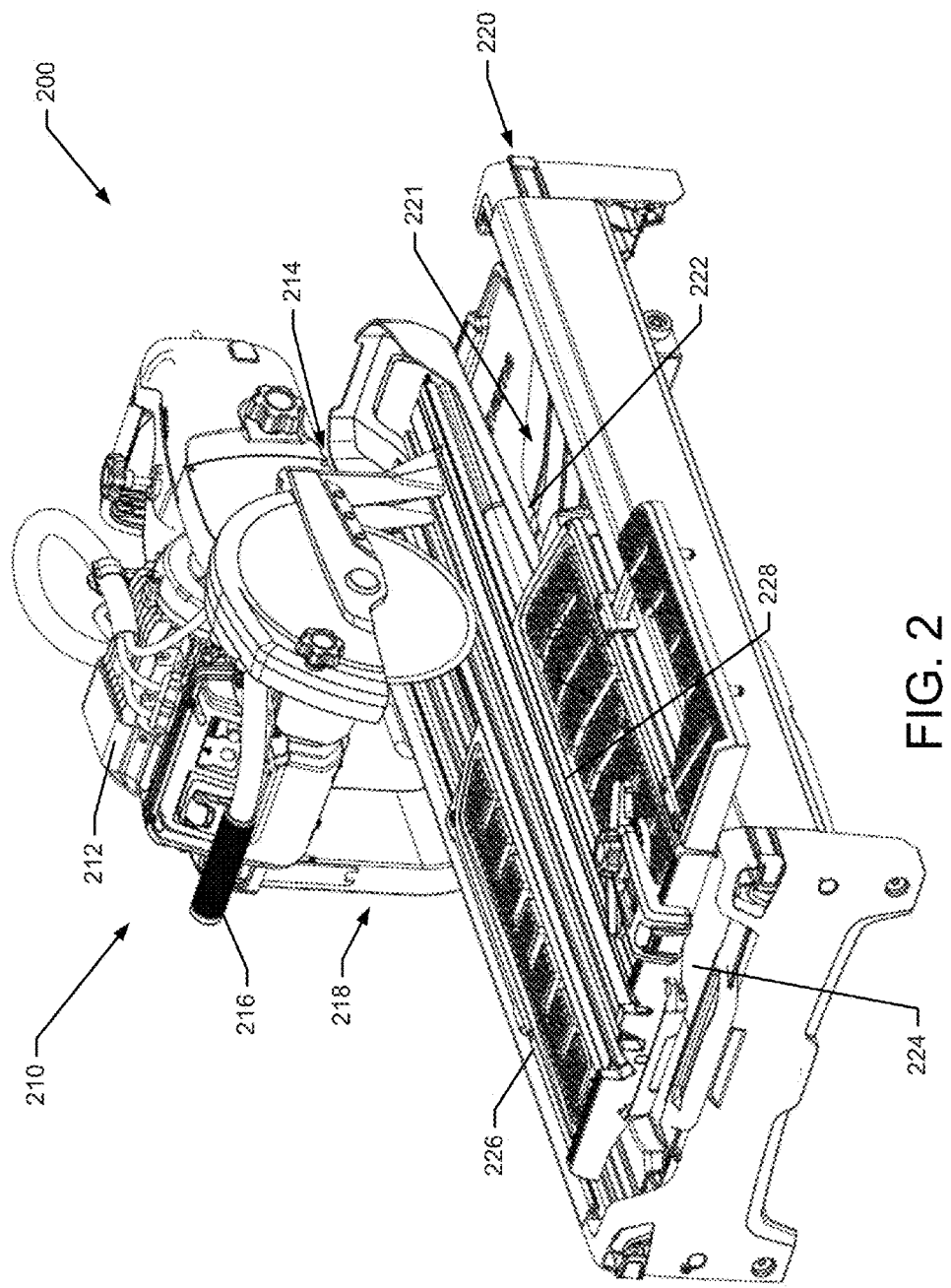
FIG. 2 shows a perspective view of tile saw employing the water collecting system and water application techniques of an example embodiment.

Although an example embodiment has been described above in the context of a masonry saw (i.e., masonry saw 100), it should be appreciated that example embodiments may also be practiced in other contexts. Accordingly, FIG. 2 is provided to illustrate a tile saw 200 that may employ an example embodiment. As such, the tile saw 200 includes many similar components to those described above including, but not limited to, a saw 210 and a frame 220. The saw 210 includes a motor 212 similar to the motor 112 described above. The saw 210 also includes a blade assembly 214 (which may include a blade guard similar to that described above), a handle 216 and a movement assembly 218. Water may be directed to a water collection system 221 including a collector 222 and a water tank 224 similar to those described above. A workpiece support 226 may also be provided, and may include trenches 228 similar to those described above. The saw 210 may move longitudinally along one side of the frame 220 via a positioning assembly 300 that includes a series of pulleys, rollers and a flexible coupling member to ride various rails or the like that extend along the frame 220 to enable the movement assembly 118 or 218 to be operably coupled thereto. The positioning assembly 300 may therefore allow the saw 110 or 210 to be moved along the rails during or in preparation for engaging in cutting.

Figure 11:
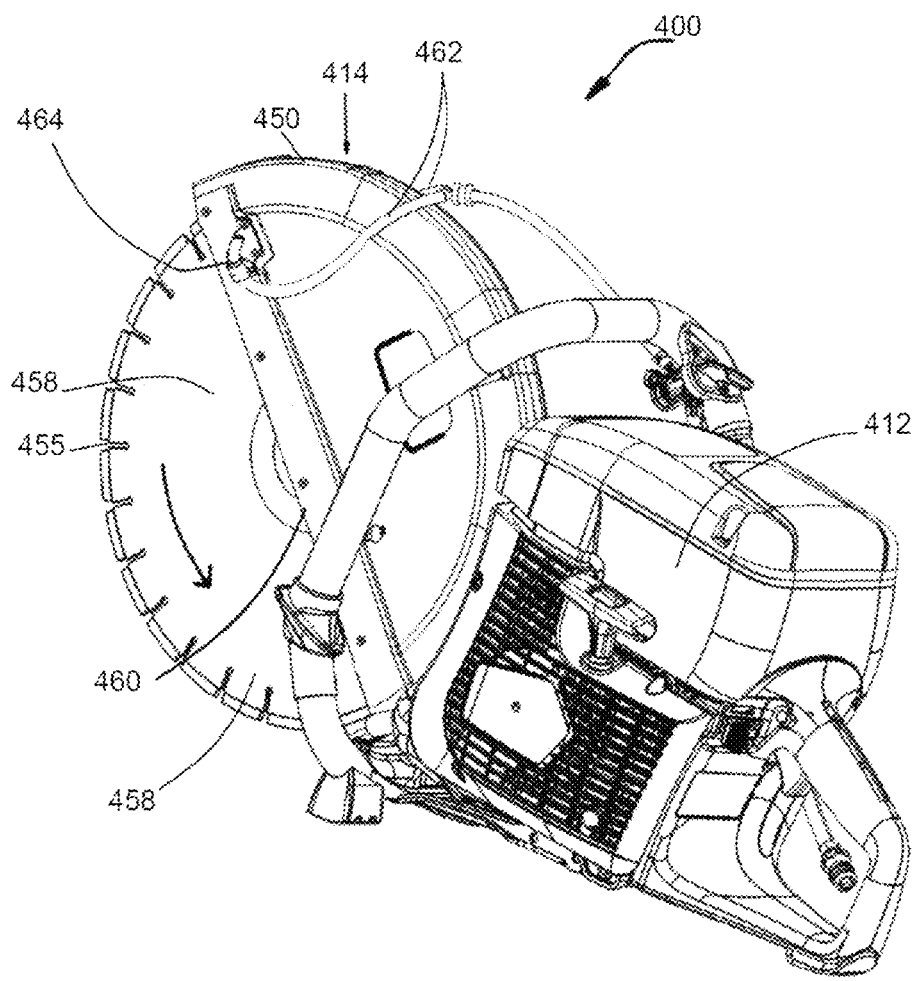
FIG. 11 shows a perspective view of a hand-held saw that may employ blade guard and nozzles in accordance with an example embodiment.

In some embodiments, the blade guard and nozzle arrangement described above may be used for saws independent of the frames 120/220 described above. Thus, for example, as shown in FIG. 11, a hand-held saw 400 (e.g., a hand-held cutoff machine) may employ some of the structures described above. The hand-held saw 400 may include a motor 412 configured to rotatably drive a blade assembly 414 that includes a blade 458. The blade 458 may be at least partially housed in a blade guard 450 that is similar to the blade guards described above. As such, for example, the blade guard 450 may include a water collector 460 disposed about the open end of the blade guard 450 to provide a relatively small clearance between the blade 458 and the water collector 460. The water collector 460 may form channels that extend along the sides of the blade 458 to collect/direct water as described above.

Hoses 462 may provide water to nozzles 464 that provide or spray the water onto the blade 458 at an upward angle and proximate to cutouts 455 in the blade 458. The nozzles 464 may generate water jets to hit the cutouts 555 to form drops or droplets. The water drops/droplets are carried with the blade 458 and in the cutouts 455 to reduce dust production during cutting. However, the relatively small clearance between the blade 458 and the collector 460 may facilitate collection of the water that is sprayed on the blade 458 through the nozzles 464 in the water collector 460 for delivery to an outlet disposed at a lower elevation end of the blade guard 450.

In some cases, the blade guard and nozzle arrangement described above may also be employed on power cutters, floor saws, road saws, wall saws, floors saws and or the like. Thus, for example, tracks may be bolted onto a floor or wall, and saws employing example embodiments may be attached to a mobility assembly that runs along the tracks. Alternatively, the mobility assembly could include wheels (e.g., at least three wheels) that ride over the ground or any concrete, asphalt or other masonry surface.

FIG. 12 illustrates an example of a road saw 500 that may have a mobility assembly in addition to the motor 512 that rotatably drives a blade assembly 514. The mobility assembly may carry the road saw 500 over a surface 501. The motor 512 may be a hydraulic, pneumatic, electric, battery-electric, or internal combustion engine. The latter is used for the shown road saw. For inhouse use an electric motor 512 is often used and the machine is called a floor saw. More generally the machine type is therefore a floor or road saw (500). The blade assembly 514 may include a blade 558 that is at least partially enclosed within blade guard 550. The blade guard 550 is provided with water via hoses 562 as described above. A water collector 560 is provided about the open end of the blade guard 550 to provide a relatively small clearance between the blade 558 and the water collector 560.

The water provided via hoses 562 is sprayed onto the blade 558 via nozzles 564 disposed on opposite sides of the blade 558 at one end of the water collector 560. The nozzles 564 may be provided at a distance less than 5 mm, preferably less than 4 mm, from the blade 558 and may be angled upwardly (relative to the axis of rotation of the blade 558) at an angle of at least 15 degrees and, in some cases, greater than 30 degrees. In some cases, the road saw 500 (or a wall saw) may be enabled to turn in either an upcut direction (shown by the dashed line arrow) or a downcut direction (shown by the solid line arrow). Given that the blade 558 may turn in either direction, an additional set of nozzles 564' may be provided at the opposite end of the water collector 560 relative to the end at which nozzles 564 are provided. As such, nozzles 564 and 564' are provided proximate to both ends of the water collector 560. In this example, the nozzles may be referred to as forward end nozzles 564 and rear end nozzles 564' to facilitate further discussion.

In an example embodiment, water valves may be coupled to both the forward end nozzles 564 and the rear end nozzles 564'. The water valves may be operable such that water can be directed to either the forward end nozzles 564 or to the rear end nozzles 564'. The decision as to which set of nozzles to provide water to may be made based on the direction of rotation of the blade 558. However, in some embodiments, water may be provided to both the forward end nozzles 564 or to the rear end nozzles 564' simultaneously. The water is carried with the blade 558 to reduce dust production during cutting. However, the relatively small clearance between the blade 558 and the collector 560 may facilitate collection of the water that is sprayed on the blade 558 through the forward end nozzles 564 or the rear end nozzles 564' in the water collector 560 for delivery to an outlet disposed at a lower elevation end of the blade guard 550. In some cases, a tail piece 580 may be provided to direct water from the water collector 560 onto the ground. A hose may also be connected to the tail piece 580 in order to collect the water. A wall saw has a very similar blade 558 and blade guard 550 as the road saw of FIG. 12, but it runs along a guiding track that is fixed to a wall or floor. Therefore it is often referred to as a wall or floor saw. Its direction of rotation may be switched, so the same applies as for the road saw described.

Based on the descriptions and drawings provided above, it should be appreciated that a tile or masonry saw assembly of an example embodiment may include a saw and a frame. The saw may include a motor operable to turn a blade of a blade assembly to cut a workpiece. The blade assembly is internally wetted during operation by nozzles disposed on opposing sides of the blade to provide water onto the blade within a blade guard configured to shield a portion of the blade. The frame is operably coupled to the saw to support the workpiece. The frame supports a water collecting system for collecting the water. The water collecting system includes a water tank that is removable from the frame.

The saw assembly of some embodiments may include additional features that may be optionally added either alone or in combination with each other. For example, in some embodiments, (1) the water tank may further include a pump housing portion configured to interface with a pump to provide water from the water tank to the nozzles. In addition to (1) or as an alternative, in some embodiments, (2) the water tank may be configured to lie in a horizontal orientation in the frame, and also be configured to be fillable and provide water to the nozzles while disposed in the frame in the horizontal orientation. In addition to (1) and (2) or as an alternative, in some embodiments, (3) the water tank may be configured to be fillable while removed from the frame in a vertical orientation so that the water tank has a suitable water level when inserted into the frame in a horizontal orientation.

In some embodiments, any or all of (1) to (3) may be employed in addition to the optional modifications or augmentations described below. For example, in some embodiments, the pump housing portion may be structured to prevent sediment from entering the pump housing portion. Additionally or alternatively, the frame may be configured to further support a collector disposed proximate to the water tank to collect water directed away from the blade assembly and provide collected water to the water tank. Additionally or alternatively, at least one surface of the water tank may be configured to direct water thereon to be collected in the water tank. Additionally or alternatively, a removable cap may be arranged proximate to a raised portion of a bottom surface of the water tank to enable the water tank to stand vertically when the cap is engaged with the water tank, and to enable the water tank to be emptied of water when the cap is removed. Additionally or alternatively, a handle may be formed at a portion of the water tank to facilitate mounting or dismounting the water tank from the frame.

In accordance with another example embodiment, a tile or masonry saw assembly may be provided to include a saw and a frame, which as described above, may include a motor operable to turn a blade of a blade assembly to cut a workpiece. The blade assembly is internally wetted during operation by nozzles disposed on opposing sides of the blade to provide water onto the blade within a blade guard configured to shield a portion of the blade. The frame is operably coupled to the saw to support the workpiece. The frame supports a water collecting system for collecting the water. The nozzles are positioned to extend into a portion of the blade guard and to point toward the blade at an upward angle relative to an axis of rotation of the blade.

The saw assembly of some embodiments may include additional features that may be optionally added either alone or in combination with each other. For example, in some embodiments, (1) the saw may further include a water collector coupled to the blade guard. The water collector may also define a blade aperture through which the blade extends. The nozzles may be provided proximate to a first end of the water collector that is closest to an operator, and the water collector may direct the water through channels to an outlet disposed at a second end of the water collector (160). In an example embodiment, (2), the water collector may be defined as a single, unitary piece removable from the blade guard. However, in some example embodiments, (3) the water collector may be defined by separate channel members. In some cases, (4) the separate channel members may be integrated into respective ones of a first blade guard member and a second blade guard member that form the blade guard.

In some embodiments, any or all of (1) to (4) may be employed in addition to the optional modifications or augmentations described below. For example, in some embodiments, the blade may include cutouts reaching inwardly from a perimeter of the blade. The nozzles may be arranged so that the jets from the nozzles hit the cutouts to form a mist. Additionally or alternatively, the nozzles may be arranged at a distance less than 5 mm, preferably less than 4 mm, from the blade. The nozzles may be directed at an angle greater than 15 degrees, preferably greater than 30 degrees relative to the axis of rotation. In some cases, the angle may be about 45 degrees. Additionally or alternatively, the saw assembly may further include a rotating splash guard pivotally coupled to the blade guard to direct water toward the water collecting system from the outlet. Additionally or alternatively, the blade guard may be rotatably arranged around the axis of rotation and a link may be arranged to turn the blade guard during the cut, so that the channels in the water collector slope downward from the first end to the second end with the outlet during the cut. Additionally or alternatively, the water collector may be disposed on the blade guard such that the nozzles are at a higher elevation than the outlet. Additionally or alternatively, at least some water dispensed into the blade guard may be carried to the workpiece, and excess water may be directed to the water collector by the blade and the blade guard.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A tile or masonry saw assembly comprising:
   a saw including a motor operable to turn a blade of a blade assembly to cut a workpiece, the blade assembly being internally wetted during operation by nozzles disposed on opposing sides of the blade to provide water onto the blade within a blade guard configured to shield a portion of the blade; and
   a frame operably coupled to the saw to support the workpiece, the frame supporting a water collecting system for collecting the water, wherein the water collecting system comprises a water tank that is removable from the frame, and wherein the water tank is defined by container walls on at least six sides.

2. The saw assembly of claim 1, wherein the water tank further comprises a pump housing portion configured to interface with a pump to provide water from the water tank to the nozzles.

3. The saw assembly of claim 2, wherein the pump housing portion is structured to prevent sediment from entering the pump housing portion.

4. The saw assembly of claim 1, wherein the water tank lies in a horizontal orientation in the frame, and wherein the water tank is provided with a removable cap so as to be finable, and wherein the water tank provides water to the nozzles while provided in the frame in the horizontal orientation.

5. The saw assembly of claim 4, wherein the water tank is provided with the removable cap so as to be also fillable while removed from the frame in a vertical orientation so that the water tank has a suitable water level when inserted into the frame in the horizontal orientation.

6. The saw assembly of claim 1, wherein the water collecting system further comprises a water collector disposed proximate to the water tank to collect water directed away from the blade assembly and to provide the collected water to the water tank.

7. The saw assembly of claim 6, wherein the water collector defines a blade aperture through which the blade extends.

8. The saw assembly of claim 6, wherein the water collector is defined as a single, unitary piece removable from the blade guard.

9. The saw assembly of claim 6, wherein the water collector is defined by separate channel members.

10. The saw assembly of claim 9, wherein the separate channel members are integrated into respective ones of a first blade guard member and a second blade guard member that form the blade guard.

11. The saw assembly of claim 6, wherein the nozzles are provided proximate to a first end of the water collector that is closest to an operator and are positioned to extend into a portion of the blade guard and to point toward the blade at an upward angle relative to an axis of rotation of the blade.

12. The saw assembly of claim 11, wherein the nozzles are arranged at a distance less than 5 mm from the blade, and are directed at an angle greater than 15 degrees relative to the axis of rotation of the blade.

13. The saw assembly of claim 11, wherein the water collector directs the water through channels to an outlet disposed at a second end of the water collector.

14. The saw assembly of claim 1, wherein the blade comprises cutouts reaching inwardly from a perimeter of the blade, and wherein the nozzles are arranged so that the jets from the nozzles hit the cutouts to form a mist.

15. The saw assembly of claim 1, further comprising a rotating splash guard pivotally coupled to the blade guard to direct water toward the water collecting system from an outlet.

16. The saw assembly of claim 1, wherein the tile or masonry saw assembly is a hand held cut off machine and the motor is either of an electric, battery-electric, hydraulic, pneumatic or an internal combustion engine.

17. The saw assembly of claim 1, wherein the tile or masonry saw assembly is a floor or road saw, having at least three wheels for movement on a surface to be cut by the blade, and the motor is either of an electric, battery-electric, hydraulic, pneumatic or an internal combustion engine.

18. The saw assembly of claim 1, wherein at least one surface of the water tank is configured to direct water thereon to be collected in the water tank.

19. A tile or masonry saw assembly comprising:
a saw including a motor operable to turn a blade of a blade assembly to cut a workpiece, the blade assembly being internally wetted during operation by nozzles disposed on opposing sides of the blade to provide water onto the blade within a blade guard configured to shield a portion of the blade; and
a frame operably coupled to the saw to support the workpiece, the frame supporting a water collecting system for collecting the water, wherein the water collecting system comprises a water tank that is removable from the frame, wherein a removable cap is arranged proximate to a raised portion of a bottom surface of the water tank to enable the water tank to stand vertically when the cap is engaged with the water tank, and to enable the water tank to be emptied of water when the cap is removed.

20. The saw assembly of claim 1, wherein a handle is formed at a portion of the water tank to facilitate mounting or dismounting the water tank from the frame.

* * * * *